Patented July 9, 1940

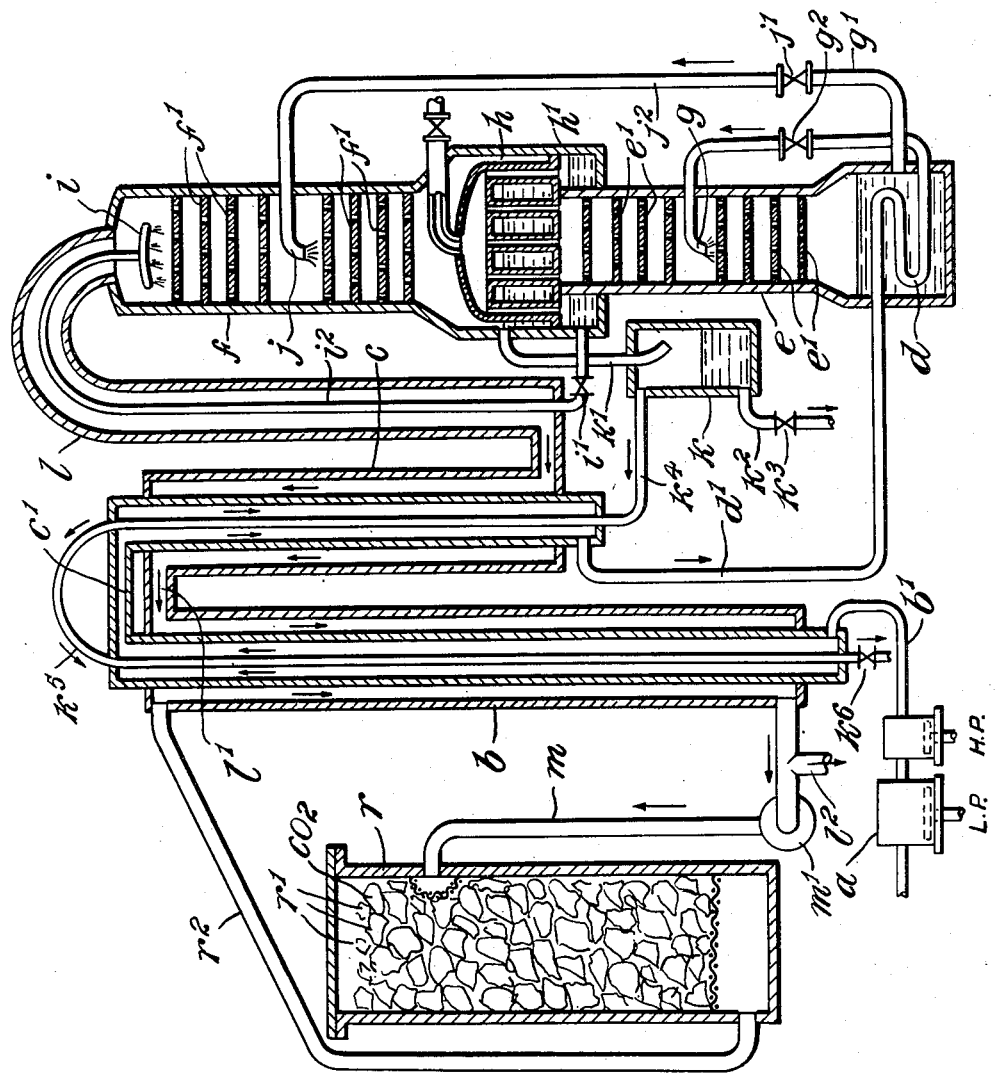

2,206,967

UNITED STATES PATENT OFFICE 2,206,967

LIQUEFACTION AND SEPARATION OF GASES

Guido Maiuri, London, England

Original application September 9, 1936, Serial No. 99,902. Divided and this application September 10, 1938, Serial No. 229,276. In Great Britain September 18, 1935

4 Claims. (Cl. 62—175.5)

This invention relates to the production of liquid air by compression and expansion of air, and also to the production of oxygen by rectification of the liquefied air and the liquefaction and separation of other gases having low liquefaction temperatures. The present application is a division of my co-pending application, Serial No. 99,902, filed September 9, 1936 now matured into Patent No. 2,160,077, issued May 30, 1939.

In the production of liquid air by compression and expansion and the production of oxygen therefrom by rectification, the nitrogen gas and oxygen gas evaporating from the liquid nitrogen and oxygen are passed through a heat-exchanger in contra-flow with the compressed air and exert a cooling effect thereon, as is likewise the unliquefied air after expansion in the production of liquid air alone.

In some modern plants before traversing the heat-exchanger, the compressed air traverses a refrigerating apparatus wherein cold is produced by the evaporating of a refrigerant liquid.

The object of the invention is to provide a convenient supplementary cooling of the compressed air in a liquid air or oxygen rectification plant.

For the above purpose, according to the invention, in the production of liquid air or oxygen by the compression and expansion of air, the cooling of the compressed air by contraflow heat-exchange with the expanded gas is supplemented by conjoint contra-flow heat-exchange with a gas cooled by passing over solid carbon dioxide. The temperature of delivery of the so-cooled gas will depend upon the partial pressure of the carbon dioxide gas, in the mixture of the gas being cooled and carbon dioxide gas, under which the carbon dioxide sublimates. With gaseous carbon dioxide constituting 10% to 7% of the mixture delivered at atmospheric pressure, the partial pressure of the carbon dioxide will be from 0.1 to 0.07 atmosphere, and the temperature correspondingly produced will be from —105° C. to —110° C. The cold gas mixture is introduced into the heat-exchanger at the point where the expanded cooling gases are at approximately the same temperature as the mixture.

A representative example of a plant embodying the invention is illustrated diagrammatically on the accompanying drawing, which shows in sectional elevation, a known air liquefying and oxygen rectifying plant, but with supplementary cooling by sublimation of solid carbon dioxide.

Referring to the drawing, $a$ is a two stage air compressor in which air is compressed to a pressure of 40 atmospheres. From the compressor $a$ the compressed air passes along a pipe $b^1$ to one end of a heat-exchanger $b$. From the other end of the heat-exchanger $b$ the compressed air passes by a pipe $c^1$ to one end of a second heat-exchanger $c$. From the other end of the second heat-exchanger $c$ the compressed air passes by a pipe $d^1$ to a pipe coil $d$ located in the bottom of the lower, pressure, column $e$ of a double oxygen rectifier $e$, $f$, of which $f$ is the upper column.

The compressed air by its passage through the two heat-exchangers $b$ and $c$ becomes cooled, as hereinafter described, to a liquefying temperature, and in fact being at 40 atmospheres some becomes liquefied in the second heat-exchanger $c$.

From the coil $d$ the compressed air passes by a pipe $g^1$ having an expansion valve $g^2$ to an expansion nozzle $g$, located in and through which the air is discharged into the lower rectifying column $e$, at a pressure of about 5 atmospheres absolute. The resultant lowering of the temperature causes liquefaction of a further part of the air.

The nozzle $g$ is situated partway up the column $e$ and the liquid air produced at and delivered by the nozzle $g$, falls over baffle plates $e^1$ in the column $e$ to the bottom of the column $e$, where the coil $d$ traversed by the compressed air on its way to the nozzle $g$ is located. The air in this coil $d$ being at a higher temperature than the liquefied gas at the bottom of the column $e$ and such liquefied gas being at a lower pressure, causes part of the liquefied gas to boil. Some of the compressed air in the coil $d$ simultaneously liquefies, so that during normal running actually a mixture of liquid and gaseous air issues from the expansion nozzle $g$ into the rectifying column $e$, some of the liquid having already been formed in the heat-exchanger $c$.

The vapours arising from the liquid boiling at the bottom of the rectifying column $e$, pass upwards past the baffle plates $e^1$, and by the time they reach the top of the lower column $e$, they have become so rectified as to consist practically of nitrogen.

The top of the lower rectifying column $e$ opens into and is closed by a tubular reflux condenser $h$, some of the tubes of which return liquid to the column $e$ and others, on the periphery, deliver liquid to a trough $h^1$. The tubes of the reflux condenser $h$ are surrounded and cooled by liquid oxygen boiling at the bottom of the upper rectifying column $f$. The pressure of 5 atmospheres existing in the lower column $e$ is sufficiently high to cause nitrogen vapour to condense in the tubes of the condenser $h$. About half the liquid nitrogen so produced flows back down the lower rectifying column $e$ and washes oxygen from the ascending vapours, whilst the remainder collects in the trough $h^1$. The liquid nitrogen collected in the trough $h^1$, is forced by the pressure reigning in the column $e$ past an expansion valve $i^1$ along a pipe $i^2$ to a nozzle $i$, at and whereby it is delivered into the top of the upper rectifying column $f$. The liquid collecting at the bottom of the lower rectifying column $e$ and which consists of about 40% of oxygen, is also forced by the pressure past an expansion valve $j^1$ along a pipe $j^2$ to a nozzle $j$, at and whereby it also is delivered into the upper rectifying column $f$, but at an intermediate height therein.

The nitrogen and oxygen expand approximately to atmospheric pressure on entering the upper rectifying column $f$, wherein the rectification is so completed, the liquids falling on baffle plates $f^1$, that the liquid which collects at the bottom of the upper rectifying column $f$ is practically pure oxygen. As already mentioned, this liquid oxygen in boiling cools the reflux condenser $h$.

Liquid oxygen overflows by a pipe $k^1$ from the bottom of the upper rectifying column $f$ into a tank $k$ from which it can be drawn off in the liquid condition along a pipe $k^2$ past a stop cock $k^3$.

Some of the oxygen passes as gas by the pipe $k^1$ to the tank $k$ and therefrom by a pipe $k^4$ to the second heat-exchanger $c$, along which it flows in contra-flow with the compressed air. From the heat-exchanger $c$ the expanded oxygen gas passes by a pipe connection $k^5$ to the first heat-exchanger $b$ along which it flows likewise in contra-flow with the compressed air, finally being delivered or escaping past a stop cock $k^6$.

The expanded nitrogen flows as gas from the top of the upper rectifying column $f$, along a pipe $l$, in heat-exchange proximity with the liquid nitrogen pipe $i^2$, to the second heat-exchanger $c$ along which it flows in contra-flow with the compressed air. From the heat-exchanger $c$ the expanded nitrogen passes by a pipe connection $l^1$ to the first heat-exchanger $b$ along which it flows likewise in contra-flow with the compressed air, to an outlet $l^2$ for excess nitrogen gas.

The expanded oxygen and nitrogen flowing in contra-flow with the compressed air exert a cooling effect on the latter, which it is desirable to amplify. For this purpose expanded nitrogen after traversing the heat-exchanger $b$, is taken by a fan or rotary compressor $m^1$ and sent through a pipe $m$ into a chamber $r$ wherein it flows past blocks $r^1$ of solid carbon dioxide. By suitably adjusting the quantity of nitrogen gas flowing past the solid carbon dioxide, the partial pressure of the evaporated carbon dioxide is kept so low that the temperature of sublimation is very low, for instance $-105°$ C. The mixture of nitrogen and carbon dioxide gas cooled to this temperature passes by a pipe $r^2$ to the other end of the heat-exchanger $b$, namely the end connected by the pipe connection $l^1$ to the other heat-exchanger $c$.

Although the invention has been described as applied to liquid air and oxygen rectifying plants, the invention is also applicable to the liquefaction and separation of other mixtures of gases, such as for instance the separation of hydrogen from carbon monoxide, hydrocarbon gas mixtures, water gas and like mixtures of gases having low liquefaction temperatures.

I claim:

1. In the method of liquefying gases by compressing and expanding gas and cooling said compressed gas by contra-flow heat-exchange with the expanded gas, the steps of producing cold by the sublimation of solid carbon dioxide under low partial pressure of carbon dioxide in an inert gas, and cooling said compressed gas by contra-flow exchange of heat with said so-cooled inert gas.

2. In the method of liquefying gases by compressing and expanding gas and cooling said compressed gas by contra-flow heat-exchange with the expanded gas, the steps of producing cold by the sublimation of solid carbon dioxide under low partial pressure of carbon dioxide in expanded gas after said contra-flow heat-exchange, and returning said so re-cooled gas to contra-flow heat-exchange with said compressed gas at the point of same temperature.

3. In the method of liquefying gases by compressing and expanding gas and cooling said compressed gas by contra-flow heat-exchange with the expanded gas, the steps of passing an inert gas in contact with an enclosed mass of solid carbon dioxide, and cooling said compressed gas by contra-flow exchange of heat with said so-cooled inert gas.

4. In the method of liquefying gases by compressing and expanding gas and cooling said compressed gas by contra-flow heat-exchange with the expanded gas, the steps of passing after said contra-flow heat-exchange expanded gas in contact with an enclosed mass of solid carbon dioxide, and returning said so re-cooled gas to contra-flow heat-exchange with said compressed gas at the point of same temperature.

GUIDO MAIURI.